US006302612B1

United States Patent
Fowler et al.

(10) Patent No.: US 6,302,612 B1
(45) Date of Patent: Oct. 16, 2001

(54) PIVOTALLY EXTENSIBLE DISPLAY DEVICE

(75) Inventors: Craig Boyd Fowler, Endwell; David Michael Henkel, Castleton; Gilford Francis Martino, Endwell; Vincent Thomas Timon, III, Binghamton, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/039,928

(22) Filed: Mar. 16, 1998

(51) Int. Cl.[7] .............................. F16C 11/00; F16D 1/12; F16D 3/00
(52) U.S. Cl. ................................................. 403/76; 16/224
(58) Field of Search ............................... 403/76, 122, 131, 403/135, 141, 142, 143; 16/224, 252; 361/681; 439/348

(56) References Cited

U.S. PATENT DOCUMENTS

| | | | |
|---|---|---|---|
| 344,918 | * 7/1886 | Miller | 403/142 |
| 3,188,460 | * 6/1965 | Thorsen et al. | 240/52 |
| 3,489,383 | * 1/1970 | Anson | 248/226 |
| 3,714,678 | * 2/1973 | Weisz et al. | 16/128 R |
| 4,471,595 | * 9/1984 | Lanzafame | 52/584 |
| 4,570,892 | * 2/1986 | Czech et al. | 248/372.1 |
| 4,621,782 | * 11/1986 | Carlson et al. | 248/183 |
| 4,720,781 | 1/1988 | Crossland et al. | 364/200 |
| 4,834,329 | * 5/1989 | Delapp | 248/183 |
| 4,852,500 | * 8/1989 | Ryburg et al. | 108/105 |
| 4,919,387 | * 4/1990 | Sampson | 248/921 |
| 5,108,062 | * 4/1992 | Detwiler | 248/185 |
| 5,128,662 | 7/1992 | Failla | 340/752 |
| 5,132,492 | * 7/1992 | Wieder | 174/65 R |
| 5,335,142 | * 8/1994 | Anderson | 361/681 |
| 5,416,666 | * 5/1995 | Maguire, Jr. | 361/681 |
| 5,590,021 | 12/1996 | Register | 361/681 |
| 5,594,620 | 1/1997 | Register | 361/681 |
| 5,659,361 | * 8/1997 | Jin | 348/75 |
| 5,687,939 | * 11/1997 | Moscovitch | 248/122.1 |
| 5,708,560 | * 1/1998 | Kumar et al. | 361/680 |
| 5,949,643 | * 9/1999 | Batio | 361/681 |
| 6,024,335 | * 2/2000 | Min | 248/371 |
| 6,094,340 | * 7/2000 | Min | 361/681 |

* cited by examiner

Primary Examiner—Lynne H. Browne
Assistant Examiner—John B. Walsh
(74) Attorney, Agent, or Firm—Shelley M Beckstrand

(57) ABSTRACT

An interface apparatus includes a base element, an interface element, and an attachment mechanism for attaching the interface element to the base element. The attachment mechanism is pivotable within a plurality of degrees of freedom. The interface element is an extensible member which is, in two of its embodiments, pivotally mounted so as to be rotatably adjustable about a pivot point with respect to a primary member. The primary member may be a base member or another display member. These members may be computer keyboards or displays, such as liquid crystal displays (LCDs), audio speakers, or the like such as are used in desk top or lap top computers and terminals.

16 Claims, 16 Drawing Sheets

MULTIPLE LCD CONFIGURATION

SIDE VIEW

TOP VIEW

FRONT VIEW

CLOSED PIVOTAL LCD

PIVOTALLY EXTENSIBLE DISPLAY DEVICE

BACKGROUND OF THE INVENTION

1. Technical Field of the Invention

This invention relates to visual information display screens for use with electronic devices such as portable computers, computer terminals, calculators, process control devices, or the like. More particularly, it relates to display screens including a plurality of screen members with an extensible member pivotally mounted so as to be rotatably adjustable about a pivot point with respect to a primary member.

2. Background Art

Notebook computers have a small viewing screen by design. That is, in order to achieve a small footprint for the notebook computer, the viewing screen is kept small. Increasing the size of the screen typically requires that the footprint be increased. This is not acceptable to a consumer, since a smaller footprint is preferred.

Several approaches to enlarging the viewing screen without increasing the size of the footprint have been proposed. These include (1) a collapsible screen which can be assembled in use and then disassembled and collapsed for compact storage; (2) a display module which is removable from a support module; (3) a secondary display module which is hinge attached for rotation into the plane of a primary display from a position substantially orthogonal thereto; and (4) a rotatable side-panel or monitor wing station mounted to a video display monitor. In these designs, however, the hinged mechanisms employed for rotating the secondary screens are limited in such a manner as to preclude positioning the secondary screen in any orientation (with three degrees of freedom) with respect to the primary screen. Such orientations are often beneficial or required for a user to view the screen in various ambient light conditions including light source location and intensity.

Consequently, it is an object of the invention to provide an improved enlargement of a viewing screen without increasing the footprint of the base device.

It is a further object of the invention to provide an improved viewing screen, rotatable within a plurality of degrees of freedom with respect to a base device.

It is a further object of the invention to provide a screen mounting apparatus for an enlarged viewing screen including a secondary screen positionable at any orientation with respect to a base device and within a plurality of degrees of freedom with respect to a primary screen without enlarging the footprint of the base device.

SUMMARY OF THE INVENTION

In accordance with the invention an interface apparatus comprises a base element, an interface element, and an attachment mechanism for attaching the interface element to the base element. The attachment mechanism is pivotable within a plurality of degrees of freedom.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the invention, an extensible member is, in two of its embodiments, pivotally mounted so as to be rotatably adjustable about a pivot point with respect to a primary member. The primary member may be a base member or another display member. These members may be computer keyboards or displays, such as liquid crystal displays (LCDs), audio speakers, or the like such as are used in desk top or lap top computers and terminals. In a first embodiment, an extension display device is pivotally mounted to a primary display device. In a second embodiment, a primary display device is pivotally mounted to a keyboard base. In a third embodiment, the extension display device is pivotally mounted to a keyboard base, which is in turn pivotally or hinge mounted to a primary display device.

Further embodiments relate to pivotally and extensibly mounting various secondary devices in various combinations to a base or to other secondary devices so mounted.

Figure 1:
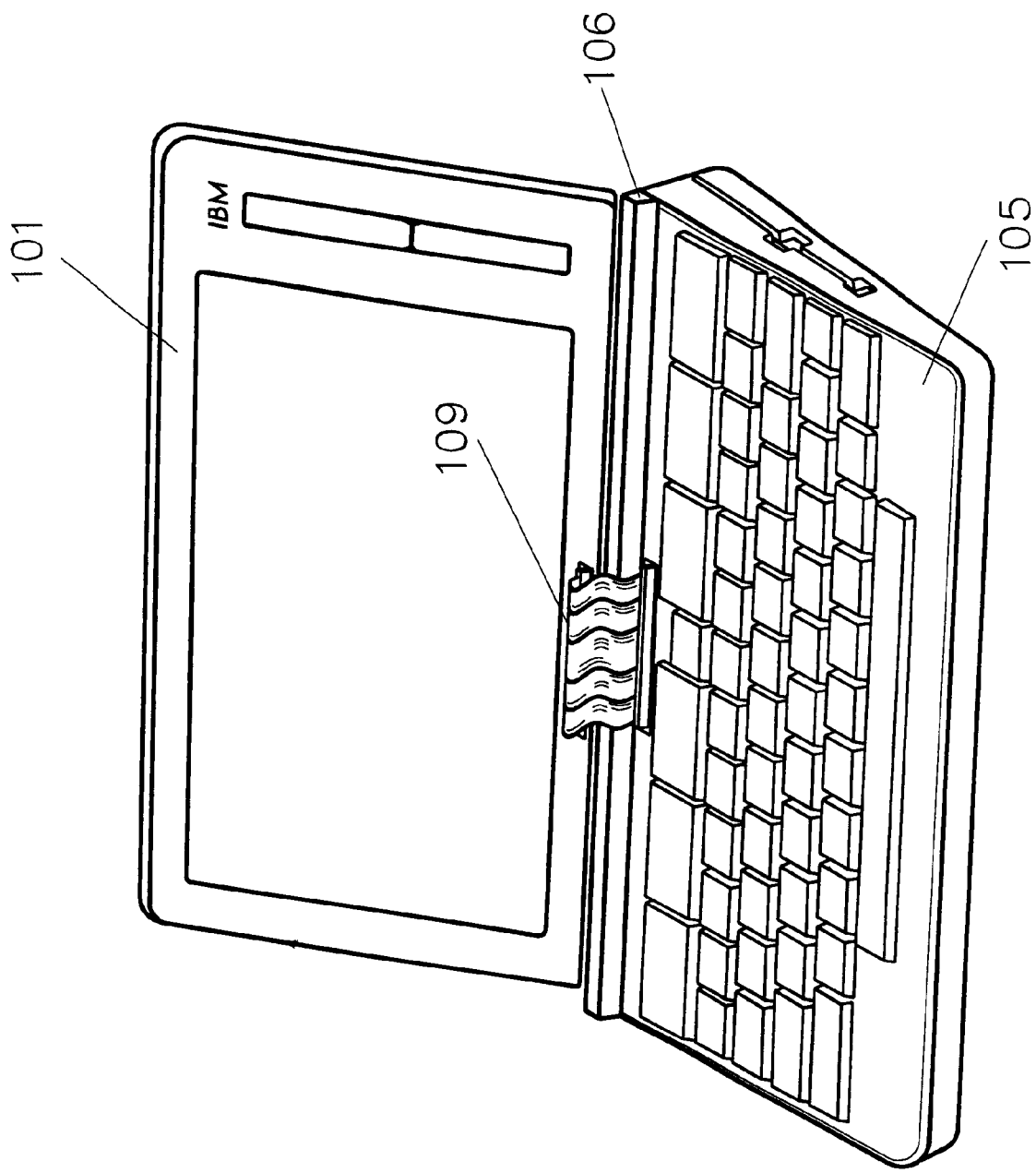
FIG. 1 illustrates an opened pivotal display member in accordance with a first embodiment of the invention.

FIG. 1 illustrates an opened pivotal display member, or LCD, 101 with rigid mounting wall 106 fixedly attached to a base member or keyboard 105. Ribbon wire 109 interconnects display member 101 and base member 105 and, in this figure, hides a pivotal connection mechanism for attaching display member 101 to base member 105 at mounting wall 106.

Figure 2:
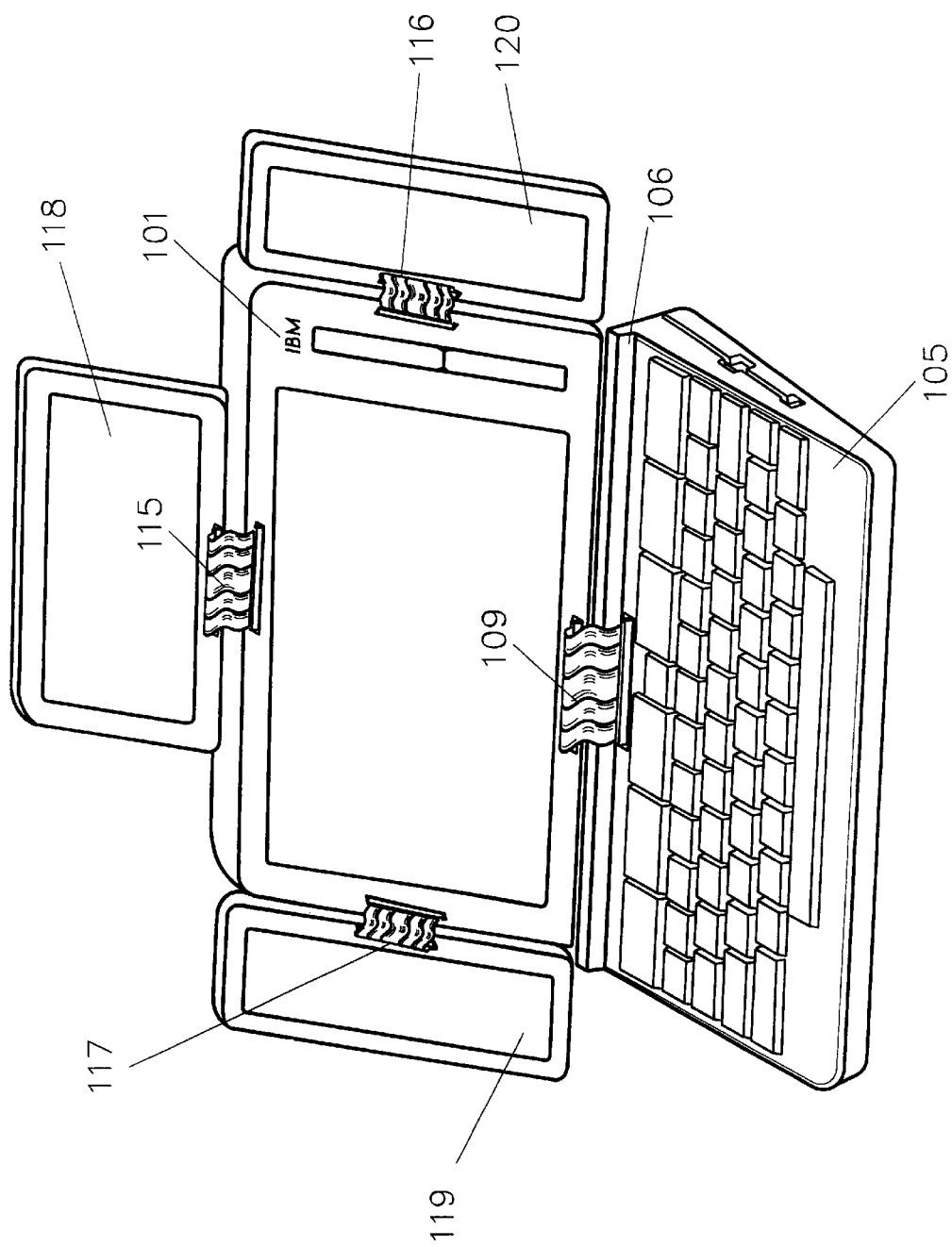
FIG. 2 illustrates multiple display members pivotally mounted in accordance with another embodiment the invention.

FIG. 2 illustrates a multiple display LCD configuration utilizing four pivotal connections, including ball and socket connections hidden, in this view, by connecting ribbons 109, and 115–117. Each pivotal connection 115–117 provides more than the normal hinge degrees of freedom. Primary LCD 101 and secondary LCD 118 are mounted by a ball and socket attachment beneath ribbon connectors 109 and 115 respectively for rotation from a closed to the open position shown, and further about the minor axis of panel 101, from left to right. The two side LCDs 119, 120 are similarly mounted for rotation forward and backward, between planes coplanar with primary display (that is, the open position as shown in FIG. 2) and parallel to the plan of primary display (that is, a closed position), and also about the minor axis of the respective side panels 119 and 120 which are, in this embodiment, parallel to the major axis of primary panel 101.

Figure 3:
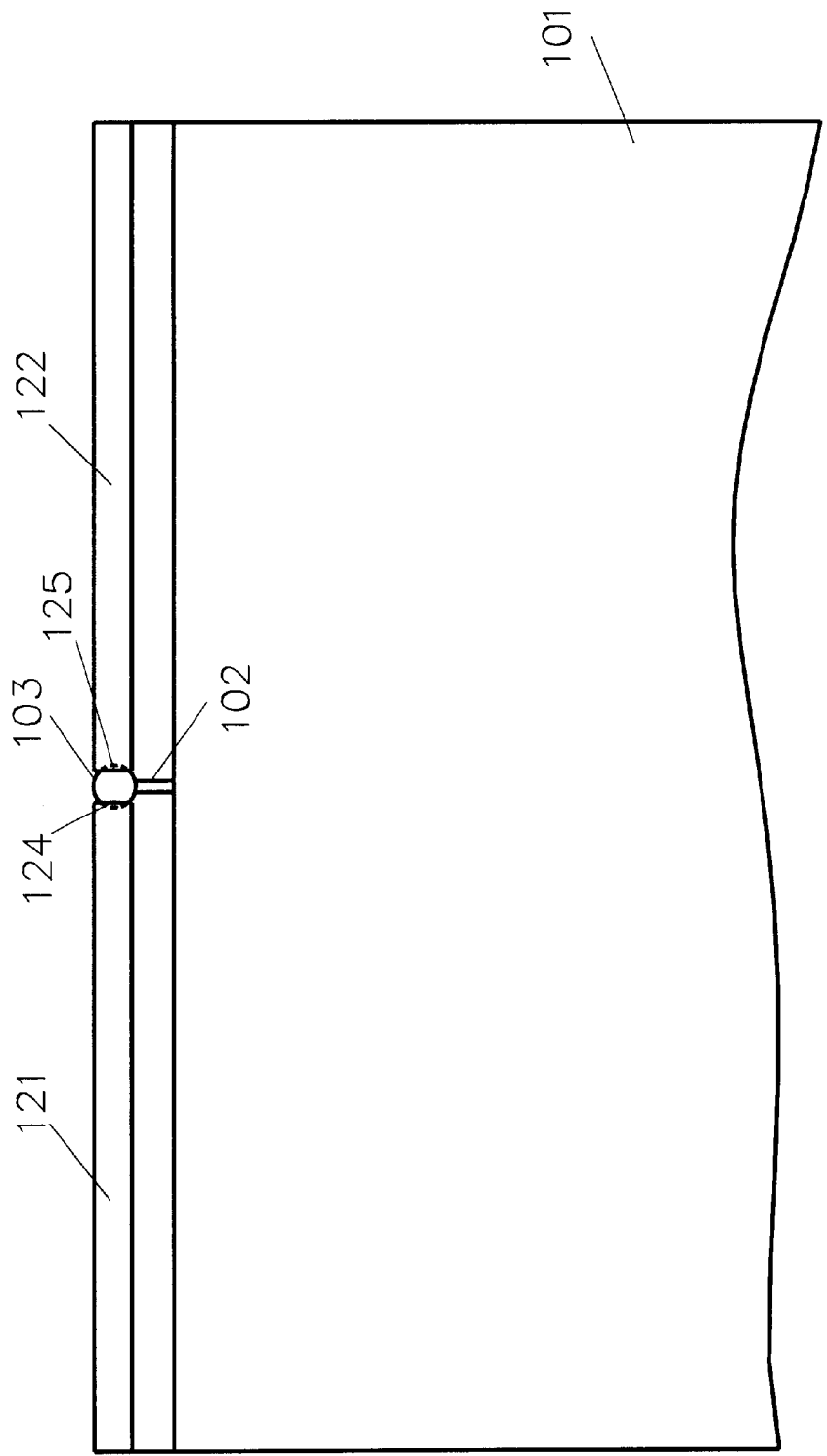
FIGS. 3 and 4 illustrate top and back views, respectively, of the closed pivotable display member of FIG. 1.
Figure 4:
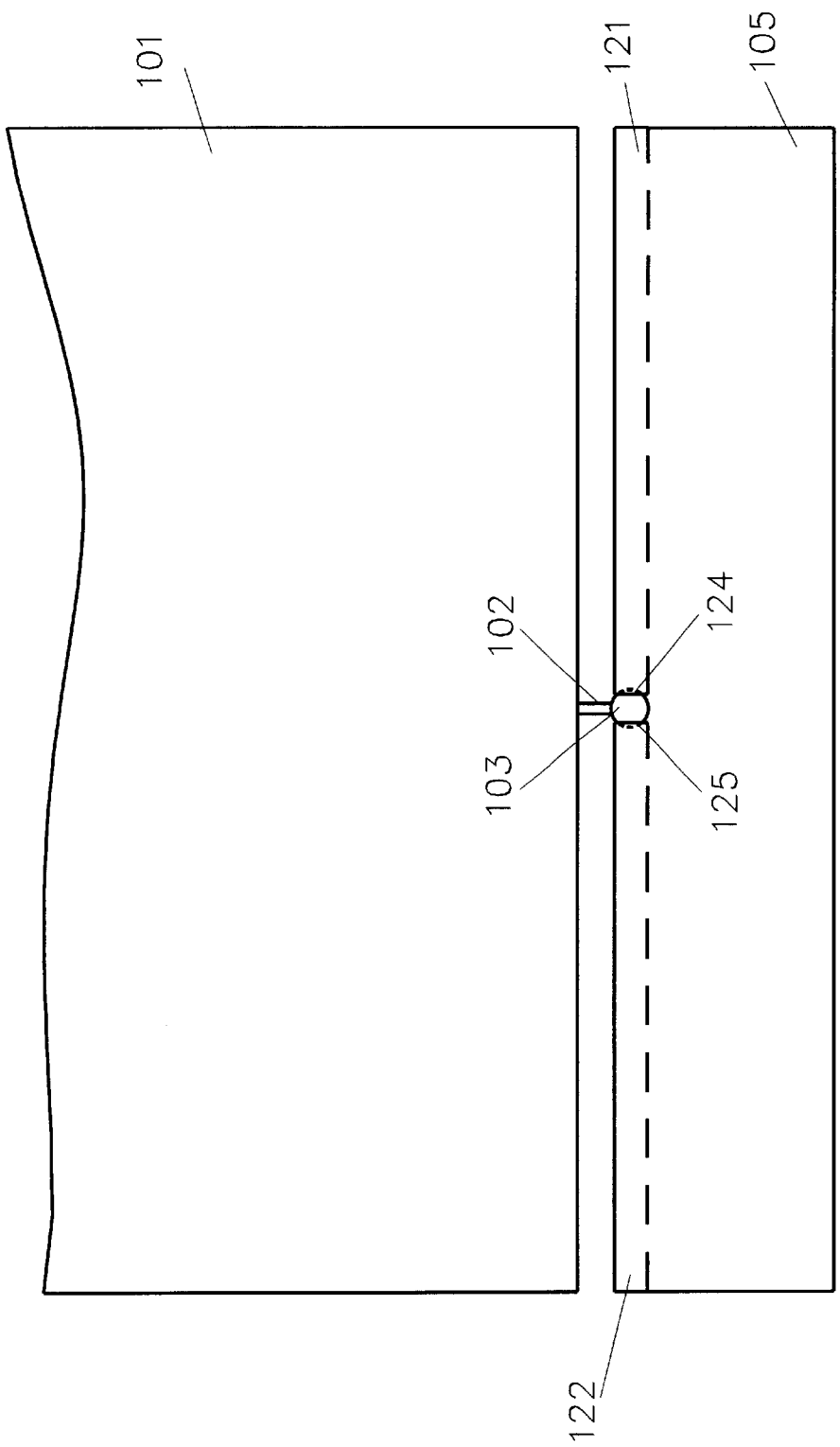

FIGS. 3 and 4 illustrate a pivotal LCD display member including a primary LCD 101 and a cylindrical support shaft 102 which provides a rigid connection from the primary LCD 101 to ball 103. Ball 103 is part of the "ball and socket" mechanism. There are two socket parts 124 and 125, one on each side of the ball 103 that are housed in the rigid mounting wall 106. Mounting wall 106 includes portions 121 and 122 fixedly attached to base member 105 with at least one portion 121, 122 preferably attached in such a manner as to permit adjustment of the pressure applied by socket portions 124 and 125 to ball 103. Sockets 124 and 125 are concave shaped parts that tightly hold the ball 103 for rotation about its center. Mounting wall 106 socket surfaces 124 and 125 hold ball 103 to pivot the primary LCD 101 in a position above base 105 so that it can close down flat as shown in FIG. 3.

Figure 5:
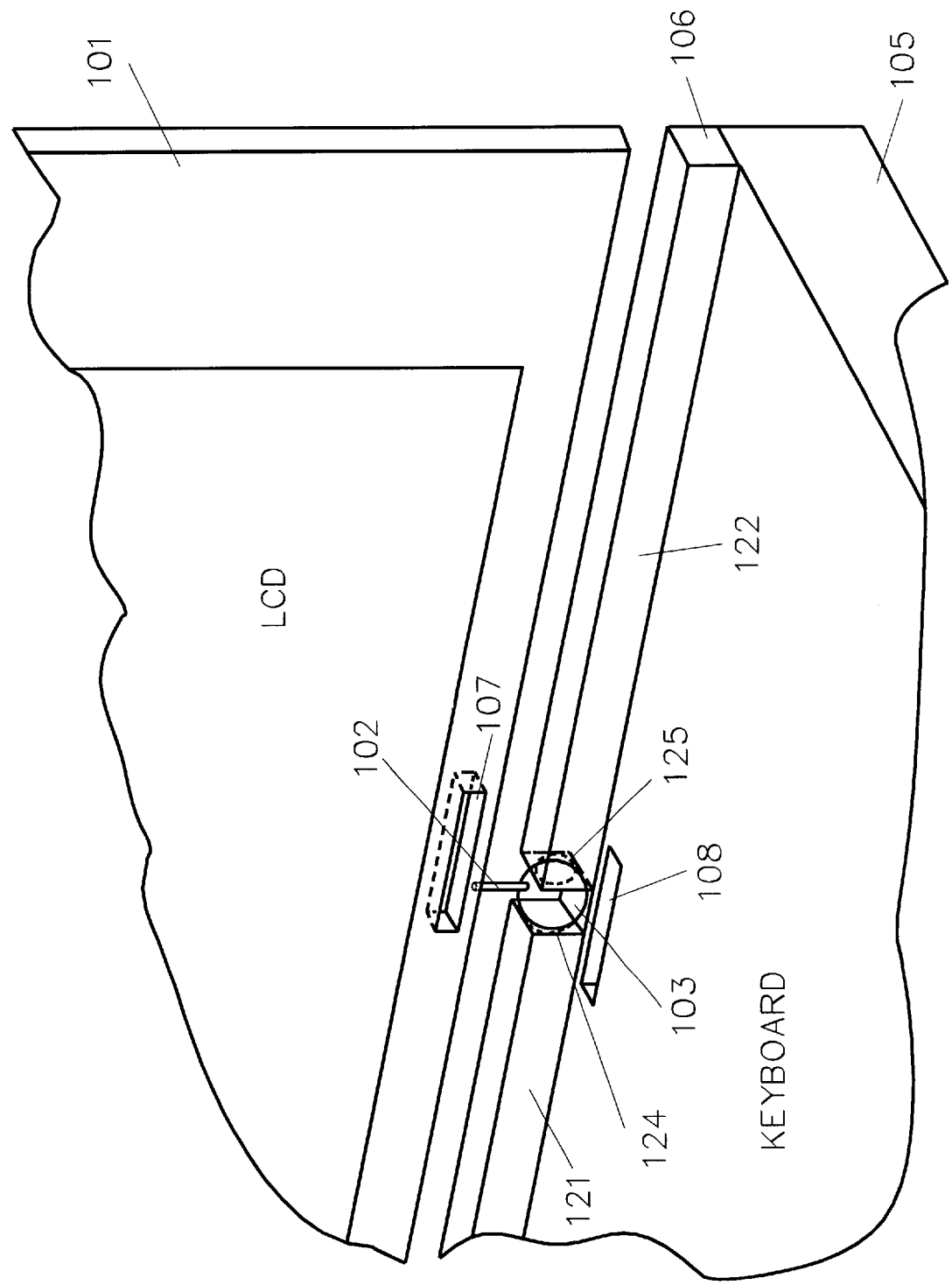
FIG. 5 illustrates a pivotable mechanism for mounting a display member to a base device in accordance with a preferred embodiment of the invention.

FIG. 5 illustrates an opened pivotal primary LCD 101 and a support shaft 102 which is a rigid connection from primary LCD 101 to the ball 103. There are two socket parts 124, 125 housed in mounting wall 106, one on each side of the ball 103. This figure shows how the primary LCD 101 can have additional degrees of freedom with an ability to rotate from side to side (about the minor axis of primary display element 101.) Ribbon connection slots 107 and 108 are provided for receiving ribbon connection 109

Figure 6:
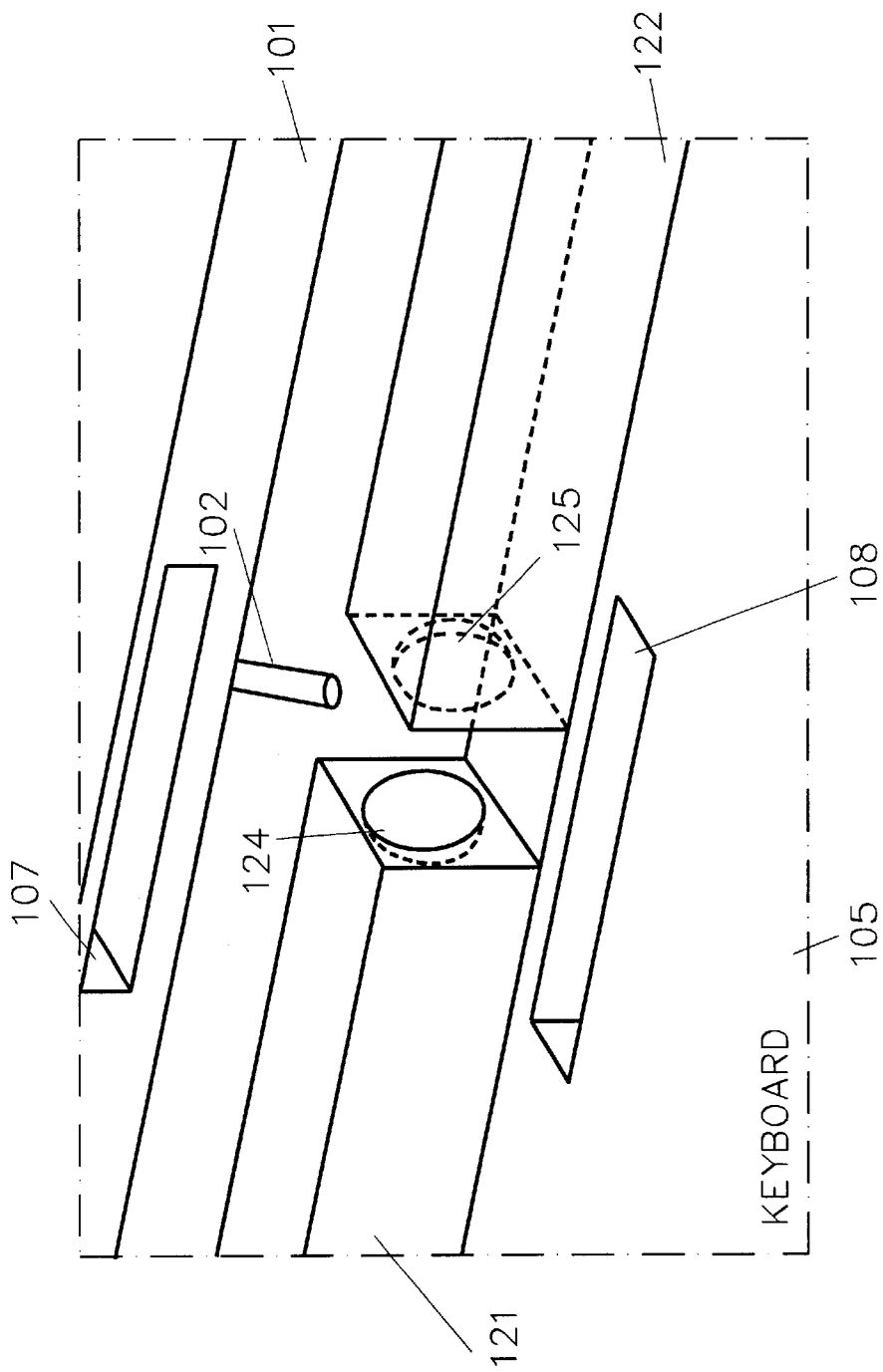
FIG. 6 is a cut-away view of the pivotable mechanism of FIG. 5 illustrating the socket portion of a ball and socket mechanism of the pivotable attachment member of the preferred embodiment of the invention.

FIG. 6 illustrates an enlarged pivotal connection without ball 103 and without ribbon wire 109. The primary LCD 101 has an attached cylindrical support 102 and a ribbon connection slot 107. The rigid mounting walls 121, 122 house concave sockets 124, 125, respectively. Base keyboard 105 contains ribbon connection slot 108 and primary display element 101 contains ribbon connection slot 107.

Figure 7:
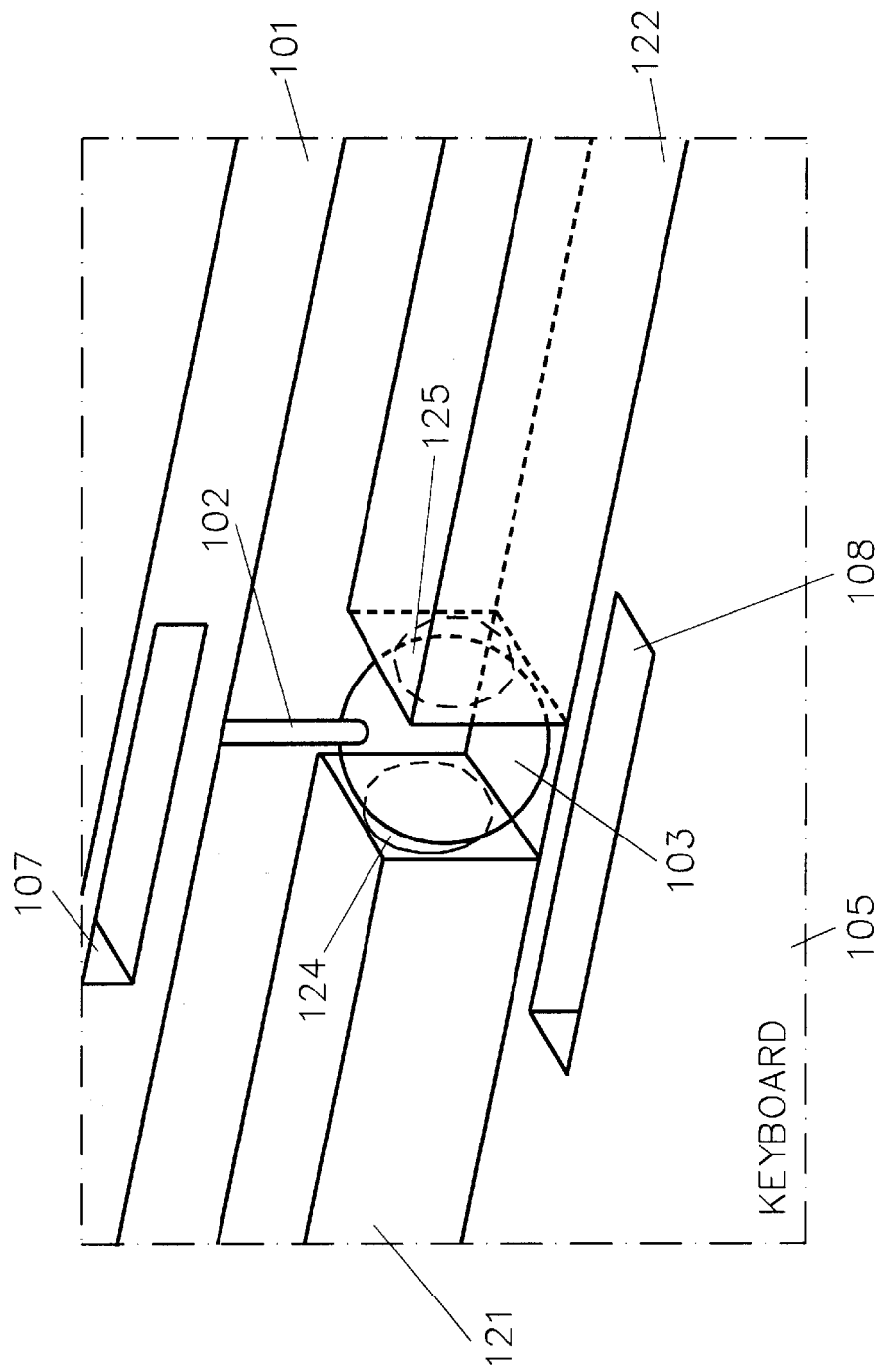
FIG. 7 is a view of the pivotable mechanism of FIG. 5 illustrating the ball and socket portions of the of the pivotable attachment member of the preferred embodiment of the invention.

FIG. 7 illustrates the enlarged pivotal connection of FIG. 6 without the ribbon wire 109, but including ball 103. Primary LCD 101 has an attached support bar or member 102 and a ribbon connection slot 107. Fixedly attached mounting walls 121, 122 house concave socket surface members 124, 125, respectively, which tightly hold ball 103 as a "ball and socket" joint. The keyboard 105 contains ribbon connection slot 108.

Figure 8:
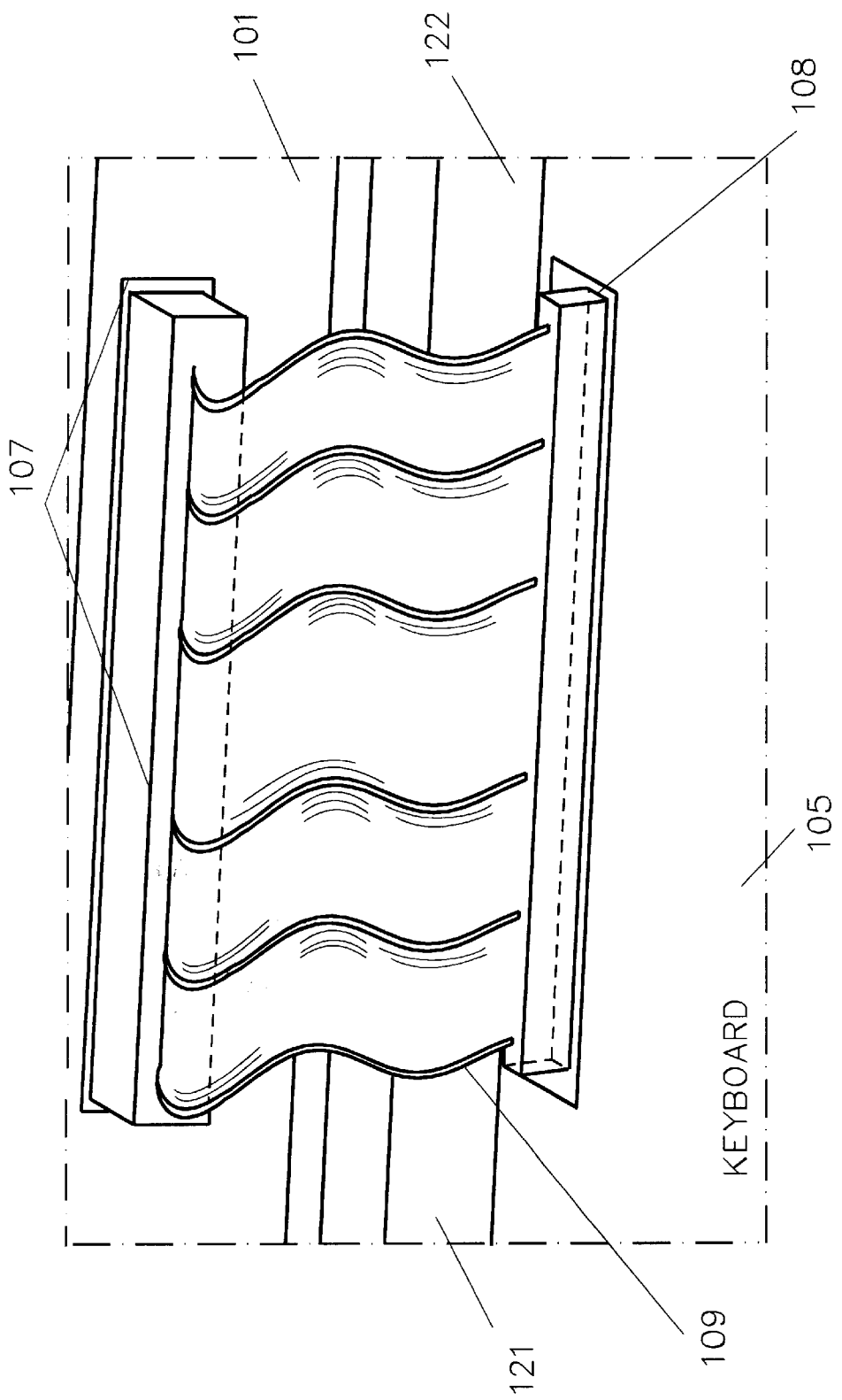
FIG. 8 is a view of a ribbon wire for interconnecting a display member and base member (or another display member) so as to allow a plurality of degrees of freedom of motion between the members.

FIG. 8 illustrates an enlarged pivotal connection without the ball 103, cylindrical support 102, and concave sockets 124 and 125. Ribbon wire 109 is shown as having sufficient length to allow more freedom for the LCD 101 to move from side to side, or rotate about its minor axis. By minimizing the number of wires required the more freedom LCD 101 will have for rotation about its minor axis. Primary LCD 101 has a ribbon connection slot 107 which connects the ribbon wire 109 for the primary LCD 101 to the ribbon connection slot 108 for the laptop, or keyboard base 105.

Figure 9:
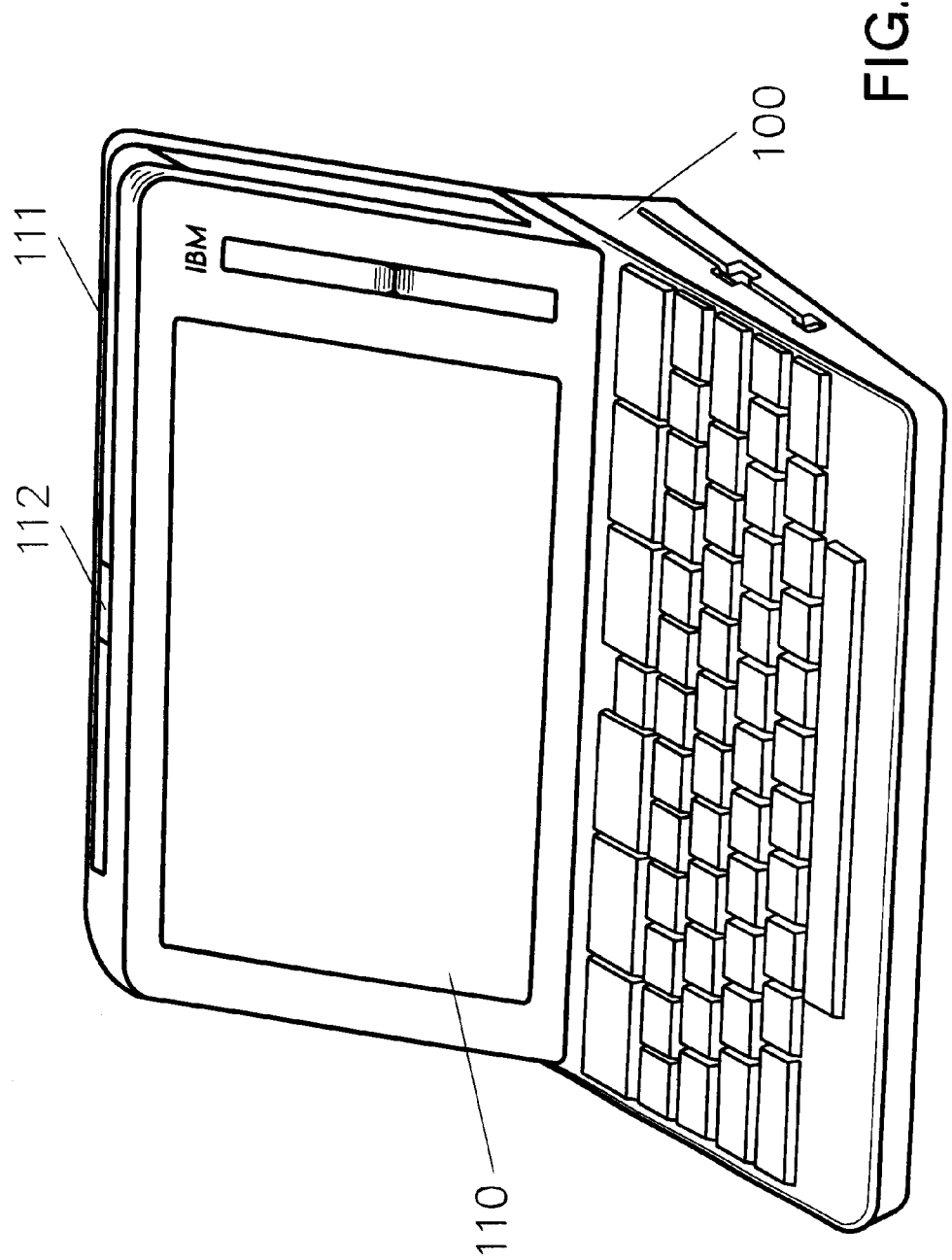
FIG. 9 illustrates a closed selectively extensible display member in accordance with another embodiment of the invention.

FIG. 9 illustrates a closed selectively extensible LCD, with the primary LCD 110, the hidden secondary LCD 111 and the closed selective extension handle 112.

Figure 10:
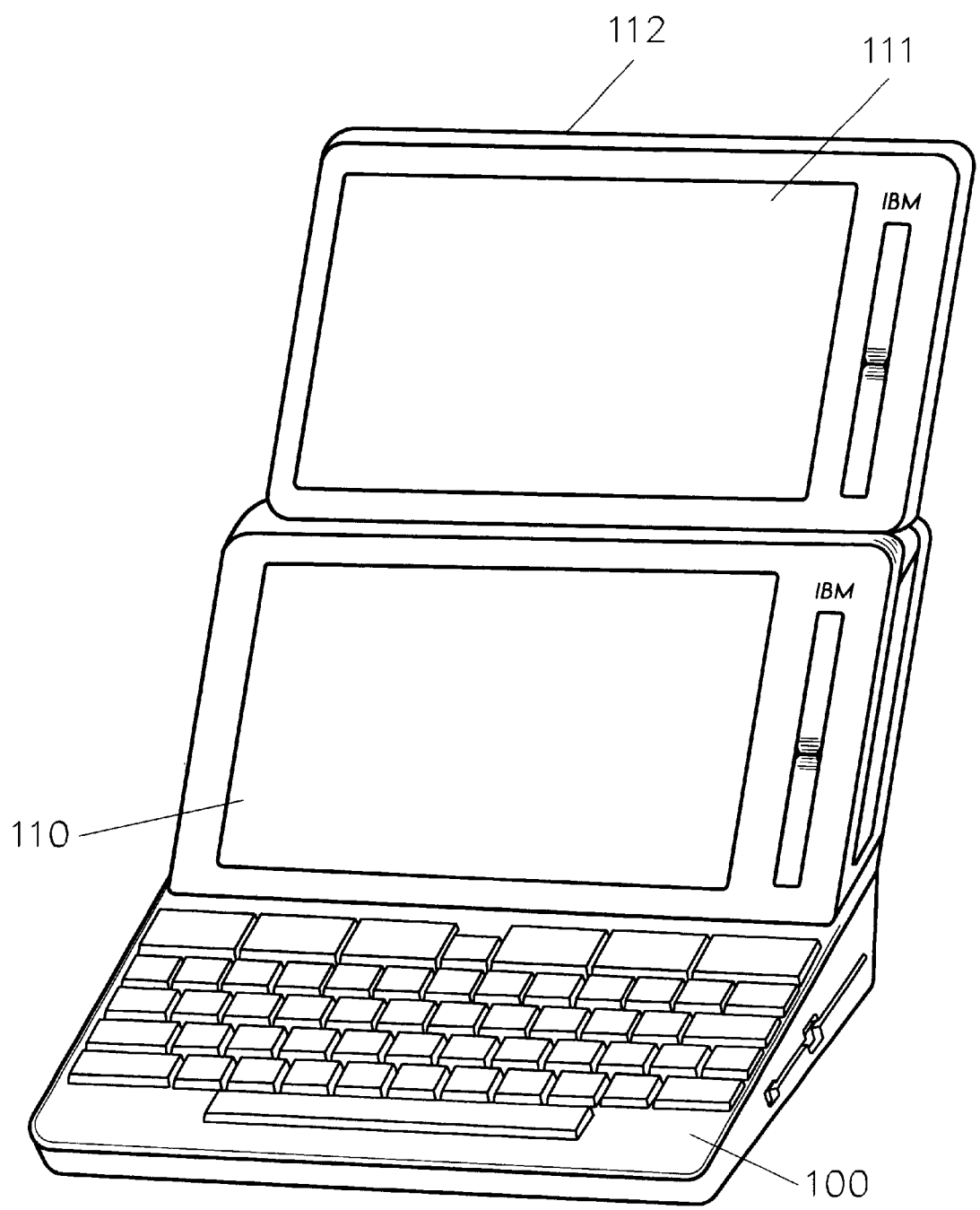
FIG. 10 illustrates the display member of the embodiment of FIG. 9 in the open position.

FIG. 10 illustrates the selectively extensible LCD of FIG. 9 in the open position, with a primary LCD 110, a secondary LCD 111 and a selective extension handle 112 which is on the back top of the secondary LCD 111. When ready to lower secondary LCD 111, the selective extension handle 112 is pulled up to release supports holding secondary LCD 111 in place. Alternatively, a friction fit is used to hold the secondary LCD 111 in place. LCD 111 may then be lowered to its locked and closed position behind the primary LCD 110, as is shown in FIG. 9.

Figure 11:
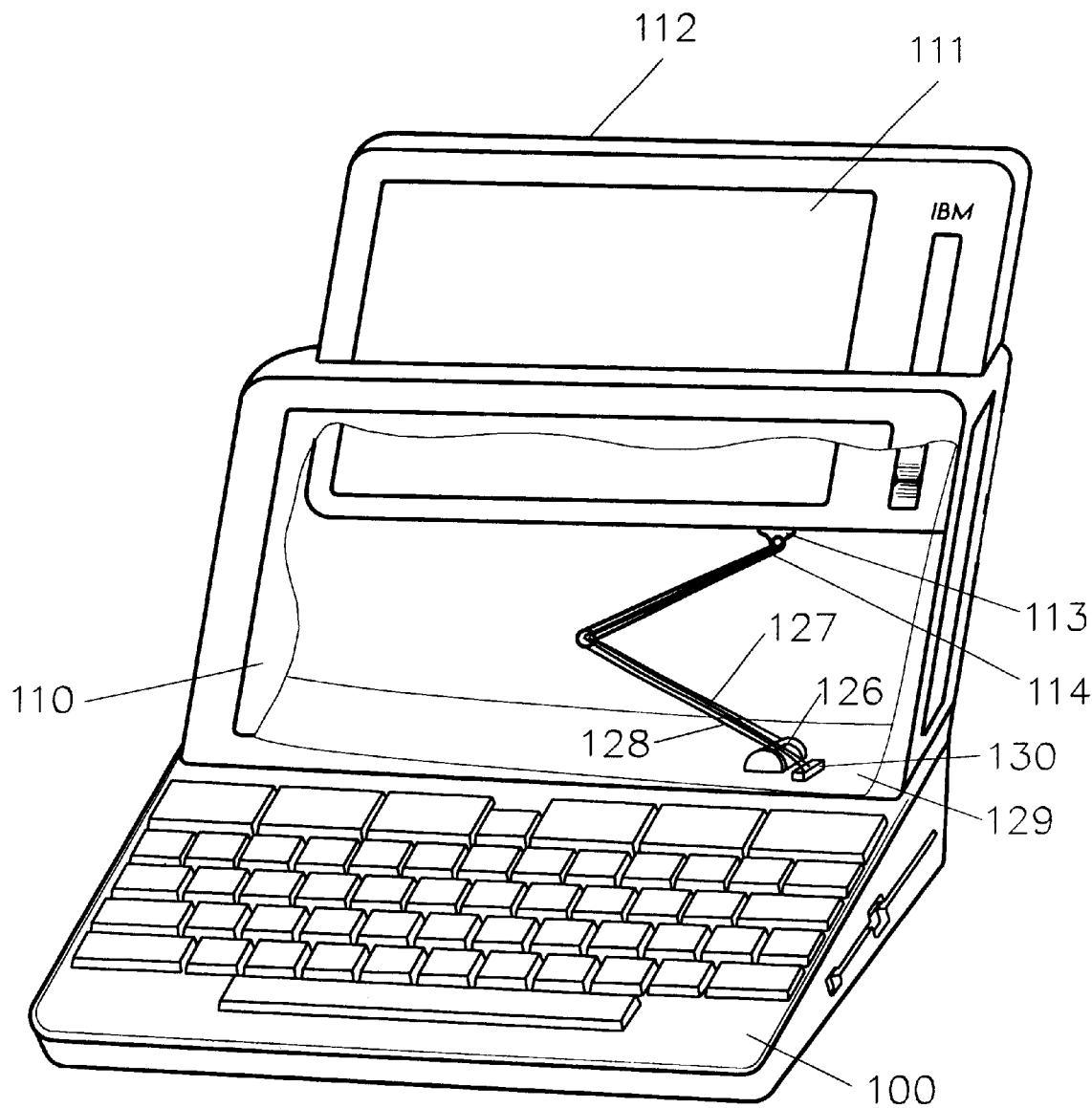
FIG. 11 is a cut away view of the display member of FIGS. 9 and 10 illustrating the selective extension support mechanism.

FIG. 11 illustrates an internal view of connecting wire 127 connection hardware and support member 114, 128. Support member 128 is attached to surface 129 of base 100 at hinge 126, and interconnection circuit wires 127 are connected by male/female plug connector 130. Secondary LCD 111 utilizes a similar male/female circuitry connection and mechanical hinge connection 113 on the bottom face of the secondary LCD 111. This support member 114, 128 is used to both support the secondary LCD 111 when extended from a collapsed position to a fully extended position and to guide interconnection circuitry 127 for the secondary LCD 111.

Figure 12:
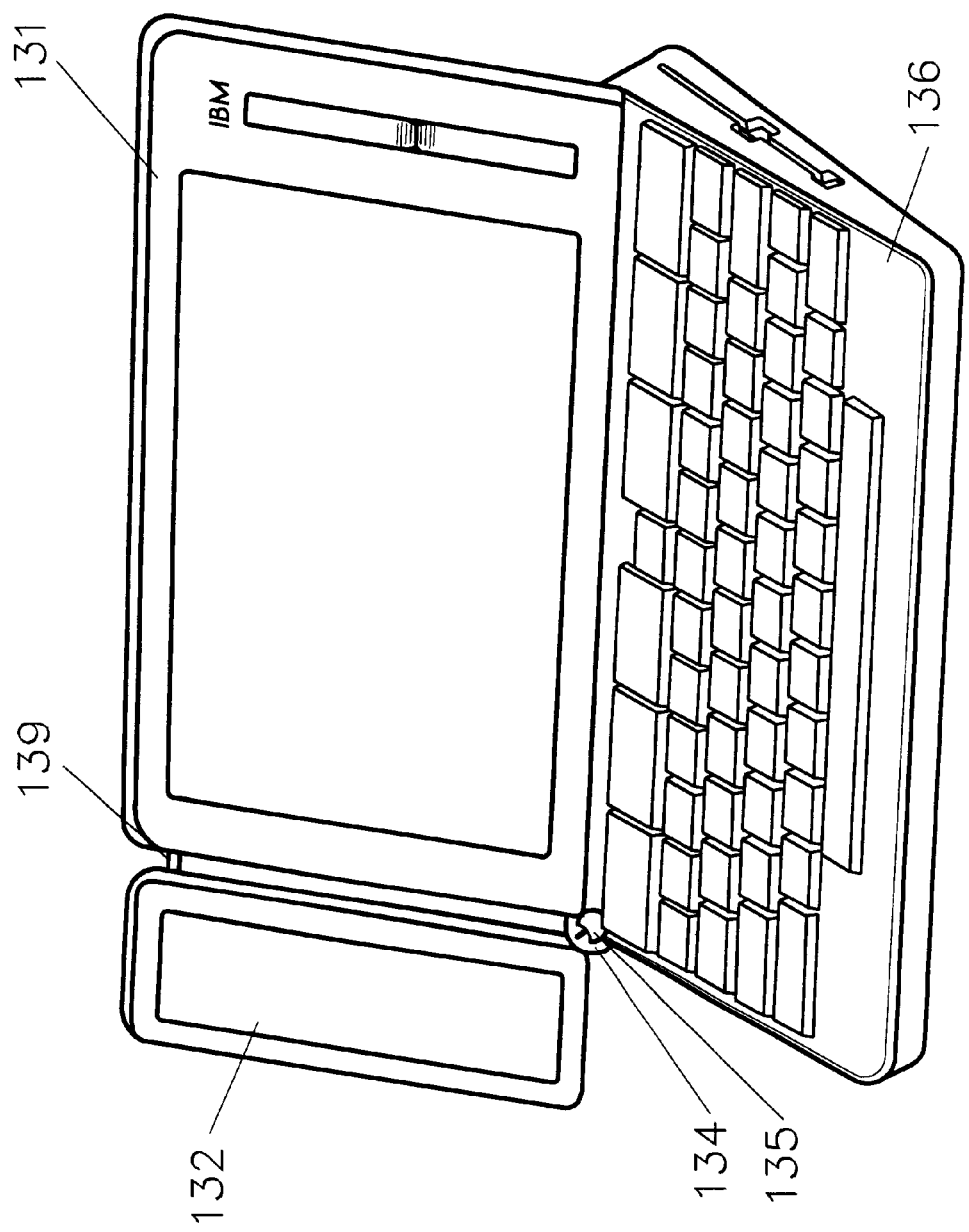
FIG. 12 illustrates a pivotally mounted side panel in accordance with a further embodiment of the invention.

FIG. 12 illustrates an opened pivotal LCD with side panel display 132 rotatably mounted to base 136 by ball 135 in socket 134. Primary LCD 131 is, in this embodiment, hinge attached to base 136. Plastic clip 139 provides additional support for secondary LCD 132 by securing it to primary LCD 131. Plastic clip 129 can be any of a number of simple attachments that would need to be manually connected after the laptop computer is opened.

Figure 16:
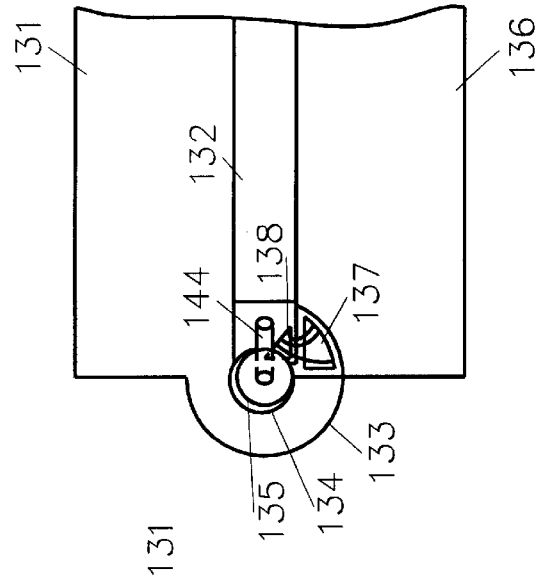
FIGS. 13 through 16 illustrate various views of the pivotable mechanism of FIG. 12 in closed position for mounting a display member to another member.
Figure 15:
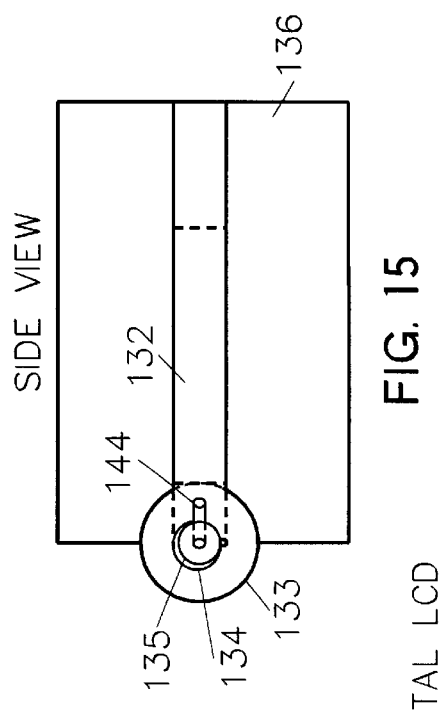
Figure 13:
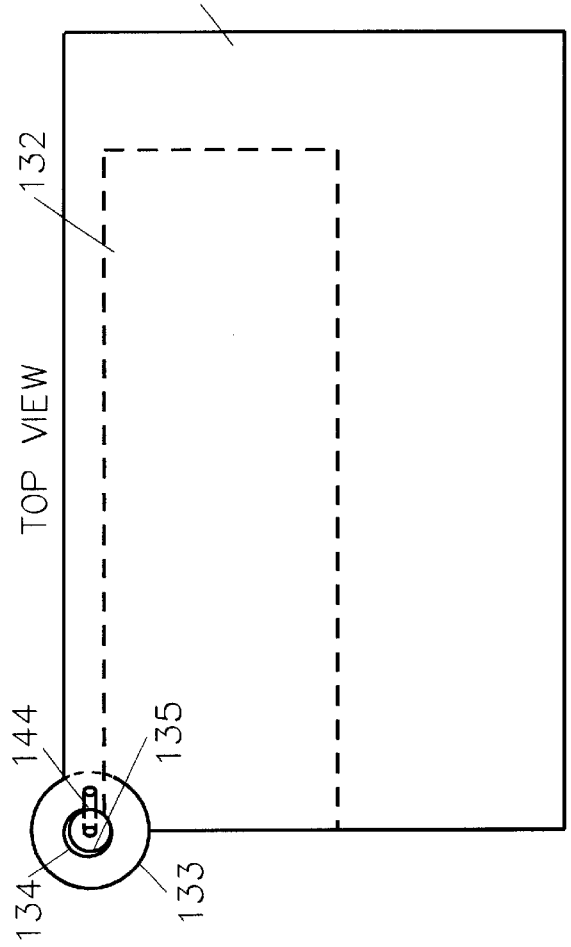
Figure 14:
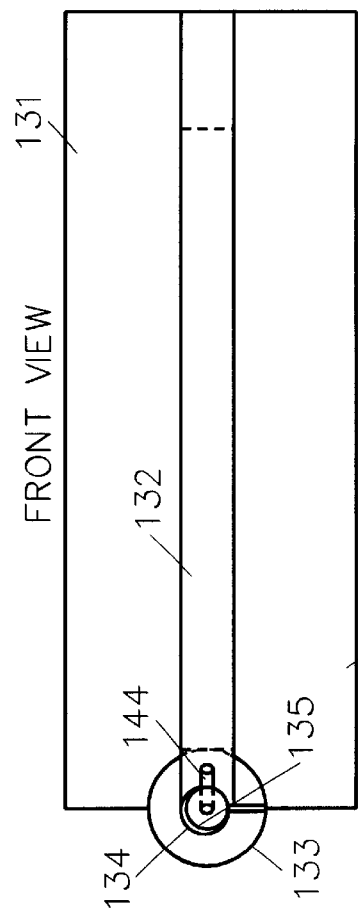

FIGS. 13–16 display a closed pivotal LCD, including primary LCD 131, secondary LCD 132, spherical encasing 133, a female spherical guide 134 to guide the pivotal LCD to an upright position. This guide 134 is attached to LCD base 136 across the back and down the corner of the pivot joint. Female guide 134 envelopes male spherical support 135 by approximately 75%, allowing for the two planes of movement necessary to bring LCD 132 to its upright position. Male spherical support 135 is attached to the secondary LCD 132 at a 45 degree angle via a connecting bar 144. This connecting bar 144 may be a cylinder optionally solid for support or hollow to pass circuitry from the secondary LCD 132 to the base laptop computer 136. FIG. 16 shows the circuitry going from base laptop computer pie piece 137 to the 45 degree face cutout 138 in side panel 132. The hollow cylinder circuitry solution requires a hole or channel in male spherical support 135 to pass circuitry to base 136 of the laptop computer. This secondary solution hides the circuit wires in their entirety.

Figure 17:
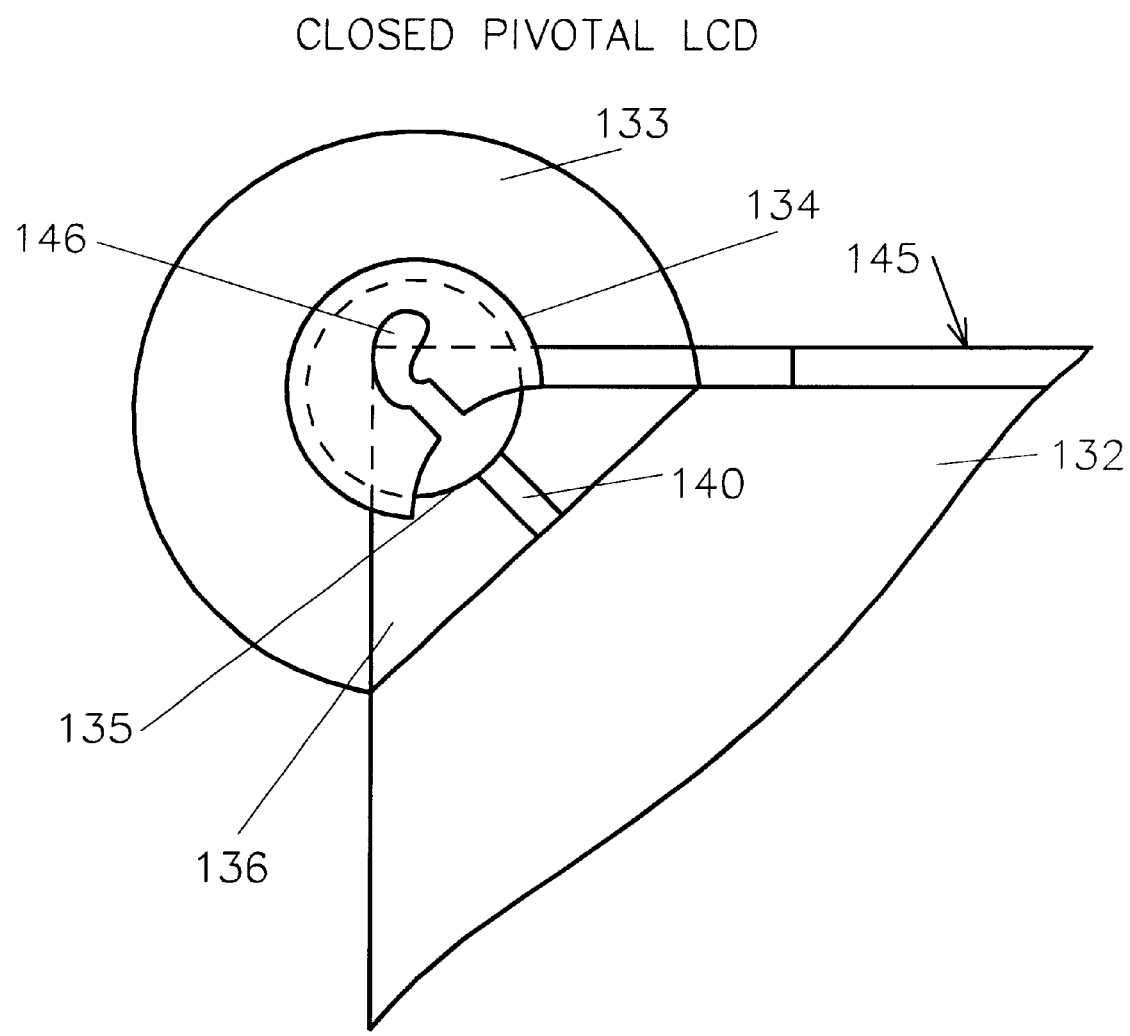
FIGS. 17 and 18 illustrate a female spherical guide and socket surface for the pivotable mechanism of FIG. 12 in closed position.

FIG. 17 illustrates female spherical guide or socket 134 for the closed pivotal LCD. This cut-away is from FIG. 13 and shows secondary LCD 132 and male spherical support 135 which is within the female spherical guide 134. Hinge 145 attaches primary LCD 131 to base 136 and does not interfere at all with movement of side panel LCD 132. The female spherical guide 134 has a slotted track 146 which attachment post 140 to secondary LCD 132 follows to open and close. This pivotal hinge provides degrees of freedom that normal hinge connections cannot, including swiveling about axes of rotation parallel to both the minor and the major axes of side panel 132, limited by how much circuitry (circuit wires) is required.

Figure 18:
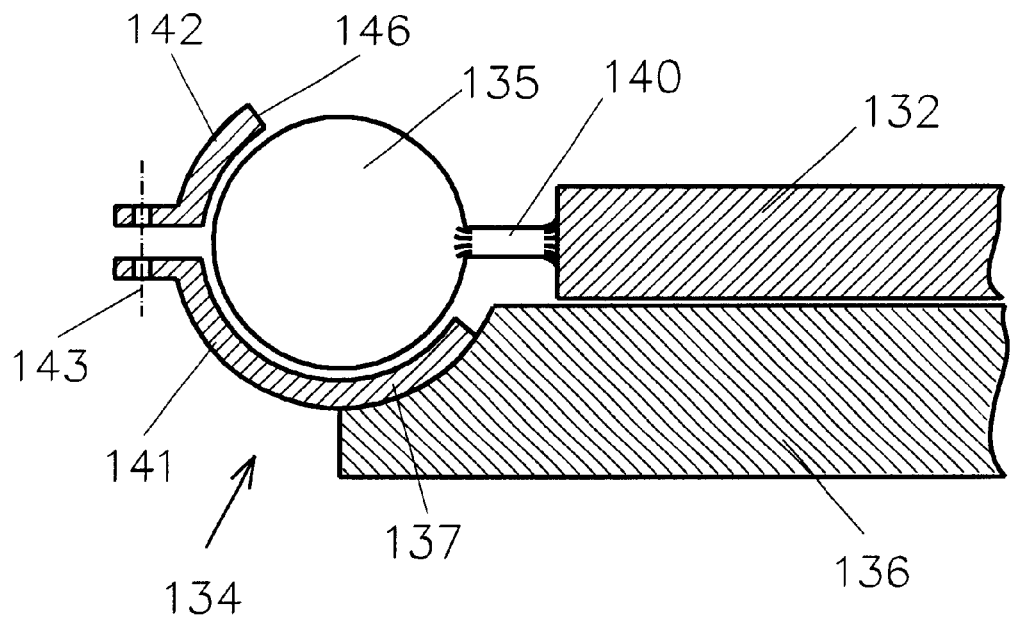

FIG. 18 illustrates a more detailed view of the ball 135 and socket 134 in accordance with an examplary embodiment of the invention. Ball 135 is fixedly attached by post 140 to secondary display panel 132 and rotates within socket 134 which, as is shown in this embodiment comprises two flanged hemispheres 141 and 142 assembled and tightened by screws (not shown) through holes drilled at center line 143 through the flanges. Socket 134 is fixedly attached to base 136 at surface 137, and is grooved at 146 to accommodate post 140 as it rotates about the center of ball 135 to position display element 132 with respect to base 136.

Figure 19:
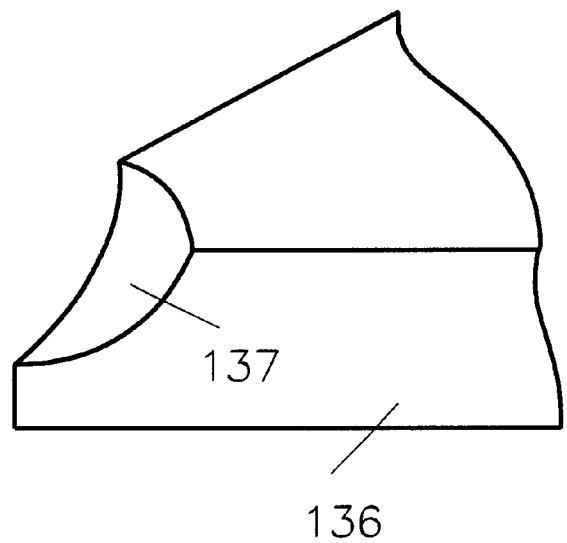
FIG. 19 illustrates the socket attachment surface of FIG. 18.

FIG. 19 illustrates the cylindrical surface 137 in base 136 to which spherical guide 134 is fixedly attached.

Figure 20:
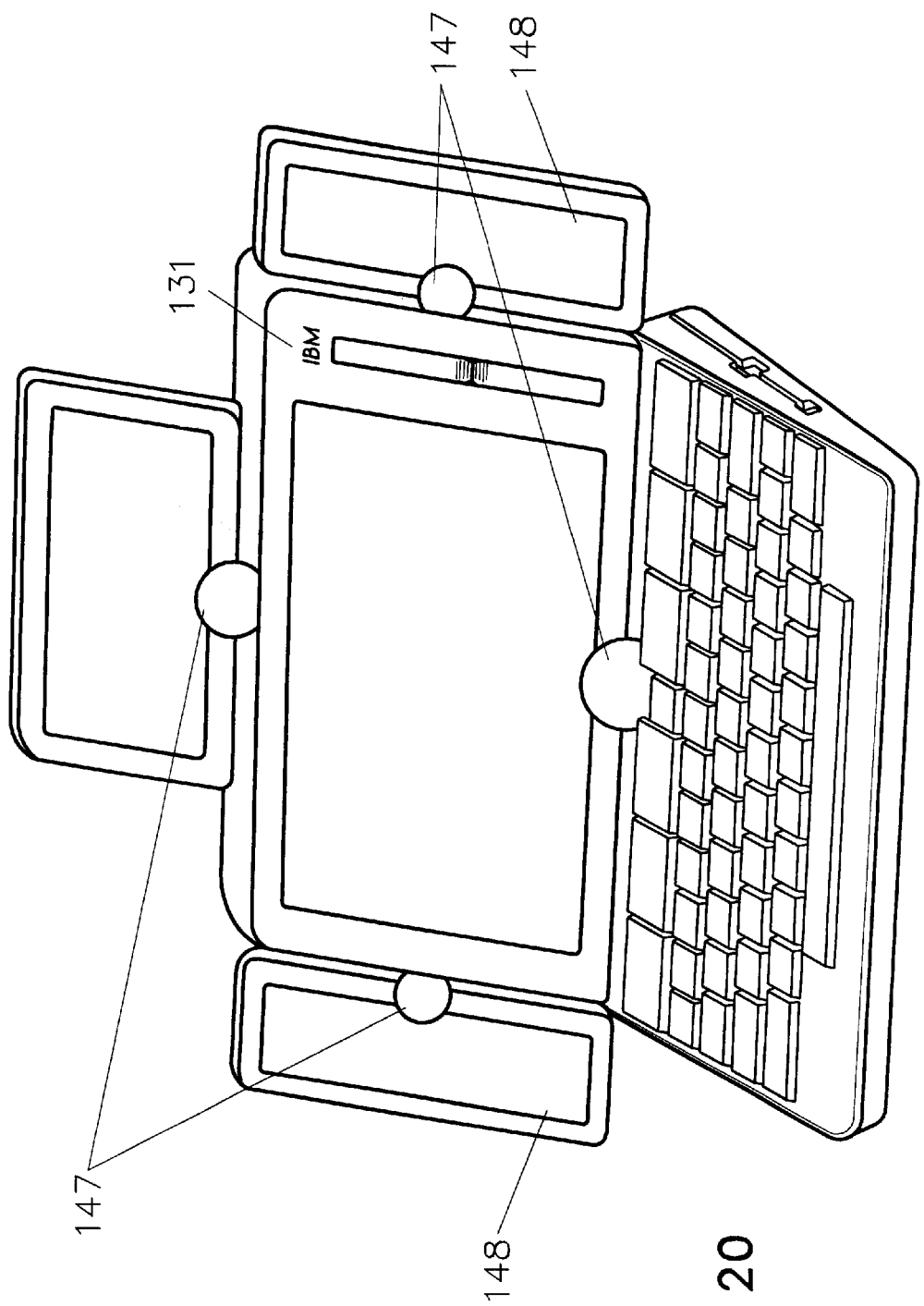
FIG. 20 illustrates a plurality of secondary display members rotatably mounted to a primary display device which is in turn rotatably mounted to a base member in accordance with another embodiment of the invention.

FIG. 20 illustrates a multiple LCD configuration utilizing pivotal hinge connections 147. Each pivotal hinge connection 147 provides more than the normal hinge degrees of freedom. For the primary LCD 131, it can now rotate from left to right. For the two side LCDs 148, they are capable of rotating forward and backward, and beyond the plane of the primary LCD 131.

In accordance with other aspects of the invention, the extensible pivotal member comprises an audio side speaker. Further, several such pivotal members may comprise any combination of displays, speakers, or other such interface elements useful on a desktop or laptop computer or other such device.

ADVANTAGES OVER THE PRIOR ART

It is an advantage of the preferred embodiment of invention that enlargement of a viewing screen is provided without increasing the footprint of the base device.

It is a further advantage of the invention that there is provided an improved viewing screen, rotatable within a plurality of degrees of freedom with respect to a base device.

It is a further advantage of the invention that there is provided a screen mounting apparatus for an enlarged viewing screen including a secondary screen positionable at any orientation with respect to a base device and within a plurality of degrees of freedom with respect to a primary screen without enlarging the footprint of the base device.

ALTERNATIVE EMBODIMENTS

It will be appreciated that, although specific embodiments of the invention have been described herein for purposes of illustration, various modifications may be made without departing from the spirit and scope of the invention.

Accordingly, the scope of protection of this invention is limited only by the following claims and their equivalents.

We claim:

1. An interface apparatus, comprising:
   a base element;
   a primary interface element;
   a secondary interface element;
   a first attachment mechanism attaching said secondary interface element at a single point to said primary interface element, said first attachment mechanism being pivotable within a plurality of degrees of freedom;
   said primary interface element being characterized by a major axis and a minor axis; and
   said first attachment mechanism is rotatable about at least one axis parallel to said major axis of said primary interface element and at least one axis parallel to said minor axis of said primary interface element;
   wherein said first attachment mechanism comprises a first ball and a first socket.

2. An interface apparatus, comprising:
   a base element;
   a primary interface element;
   a secondary interface element;
   a first attachment mechanism attaching said secondary interface element to said primary interface element, said first attachment mechanism being pivotable within a plurality of degrees of freedom and rotatable about at least one axis parallel to a major axis of said primary interface element and at least one axis parallel to a minor axis of said primary interface element; and
   a second attachment mechanism for rotatably attaching said primary interface element to said base element, said second attachment mechanism comprising a hinge enabling rotation of said primary interface element about a single axis, and wherein said first attachment mechanism is positioned for rotation about axes offset from said single axis.

3. The interface apparatus of claim 2, wherein said second attachment mechanism comprises a second ball and a second socket adapted to enable rotation of said primary interface element about a plurality of axes of rotation.

4. The interface apparatus of claim 3, wherein said second ball is fixedly attached by a post to said primary interface element; said second socket is fixedly attached to said base element and grooved so as to direct movement of said post in a manner enabling rotation of said second ball about a plurality of axis of rotation.

5. An interface apparatus, comprising:
   a base element;
   an interface element;
   an attachment mechanism attaching said interface element at a single point to said base element, said attachment mechanism being a ball and socket pivotable within a plurality of degrees of freedom; and
   interconnecting circuitry adapted for interconnecting said base element and said interface element;
   wherein said ball is fixedly attached by a post to said interface element; said socket is fixedly attached to said base element and grooved so as to direct movement of said post in a manner enabling rotation of said ball about a plurality of axis of rotation.

6. The interface apparatus of claim 5, said interconnecting circuitry being adapted for interconnecting said base element and said interface element throughout the motion enabled by the groove in said socket.

7. An interface apparatus, comprising
   a base element;
   a primary element;
   a secondary element;
   a first attachment mechanism attaching said secondary interface element at a single point to said primary interface element, said first attachment mechanism being pivotable within a plurality of degrees of freedom;
   said primary interface element being characterized by a major axis and a minor axis; and
   said first attachment mechanism is rotatable about at least one axis parallel to said major axis of said primary interface element and at least one axis parallel to said minor axis of said primary interface element;
   further comprising a second attachment mechanism for rotatably attaching said primary interface element to said base element.

8. The interface apparatus of claim 7, wherein said second attachment mechanism comprises a hinge enabling rotation of said primary interface element about a single axis, and wherein said first attachment mechanism is positioned for rotation about axes offset from said single axis.

9. The interface apparatus of claim 8, wherein said second attachment mechanism comprises a second ball and a second socket adapted to enable rotation of said primary interface element about a plurality of axes of rotation.

10. The interface apparatus of claim 9, wherein said second ball is fixedly attached by a post to said primary interface element; said second socket is fixedly attached to said base element and grooved so as to direct movement of said post in a manner enabling rotation of said second ball about a plurality of axis of rotation.

11. An interface apparatus, comprising:

a base element;

a primary interface element;

a secondary interface element;

a first attachment mechanism attaching said secondary interface element at a single point to said primary interface element, said first attachment mechanism being pivotable within a plurality of degrees of freedom;

said primary interface element being characterized by a major axis and a minor axis;

said first attachment mechanism is rotatable about at least one axis parallel to said major axis of said primary interface element and at least one axis parallel to said minor axis of said primary interface element; and said primary interface element being a display;

further comprising a second attachment mechanism for rotatably attaching said primary interface element to said base element.

12. An interface apparatus, comprising:

a base element;

a primary interface element;

a secondary element;

a first attachment mechanism attaching said secondary interface element at a single point to said primary interface element, said first attachment mechanism being pivotable within a plurality of degrees of freedom;

said primary interface element being characterized by a major axis and a minor axis;

said first attachment mechanism is rotatable about at least one axis parallel to said major axis of said primary interface element and at least one axis parallel to said minor axis of said primary interface element; and said first attachment mechanism comprising a ball and a socket.

13. An interface apparatus, comprising:

a base element;

a primary interface element;

a secondary interface element;

a first attachment mechanism attaching said secondary interface element at a single point to said primary interface element, said first attachment mechanism being pivotable within a plurality of degrees of freedom;

said primary interface element being characterized by a major axis and a minor axis;

said first attachment mechanism is rotatable about at least one axis parallel to said major axis of said primary interface element and at least one axis parallel to said minor axis of said primary interface element; and a second attachment mechanism for rotatably attaching said primary interface element to said base element.

14. The interface apparatus of claim 13, wherein said second attachment mechanism comprises a hinge enabling rotation of said primary interface element about a single axis, and wherein said first attachment mechanism is positioned for rotation about axes offset from said single axis.

15. The interface apparatus of claim 14, wherein said second attachment mechanism comprises a second ball and a second socket adapted to enable rotation of said primary interface element about a plurality of axes of rotation.

16. The interface apparatus of claim 15, wherein said second ball is fixedly attached by a post to said primary interface element; and second socket is fixedly attached to said base element and grooved so as to direct movement of said post in a manner enabling rotation of said second ball about a plurality of axis of rotation.

* * * * *